US012580795B2

(12) United States Patent
Bahn et al.

(10) Patent No.: US 12,580,795 B2
(45) Date of Patent: Mar. 17, 2026

(54) ELECTRONIC DEVICE FOR PROCESSING WIRELESS SIGNAL, AND OPERATING METHOD THEREFOR

(71) Applicant: SAMSUNG ELECTRONICS CO., LTD., Suwon-si (KR)

(72) Inventors: Dongha Bahn, Suwon-si (KR); Chanjong Park, Suwon-si (KR); Junik Jang, Suwon-si (KR); Jaeil Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/379,979

(22) Filed: Oct. 13, 2023

(65) Prior Publication Data

US 2024/0039768 A1 Feb. 1, 2024

Related U.S. Application Data

(63) Continuation of application No. PCT/KR2022/002858, filed on Feb. 28, 2022.

(30) Foreign Application Priority Data

Apr. 13, 2021 (KR) ......................... 10-2021-0048011
Dec. 7, 2021 (KR) ......................... 10-2021-0174176

(51) Int. Cl.
*H04L 25/02* (2006.01)
*H04L 25/03* (2006.01)

(52) U.S. Cl.
CPC .... *H04L 25/0254* (2013.01); *H04L 25/03006* (2013.01); *H04L 2025/03433* (2013.01)

(58) Field of Classification Search
CPC ........... H04L 25/0254; H04L 25/03006; H04L 2025/03433
See application file for complete search history.

(56) References Cited

U.S. PATENT DOCUMENTS

| | | | |
|---|---|---|---|
| 10,833,785 B1 | 11/2020 | O'Shea et al. | |
| 11,005,697 B2 * | 5/2021 | Liston ................... | H04L 27/261 |

(Continued)

FOREIGN PATENT DOCUMENTS

| | | |
|---|---|---|
| CN | 108650201 A | 10/2018 |
| CN | 108833313 A | 11/2018 |

(Continued)

OTHER PUBLICATIONS

Gizzini et al., "Deep Learning Based Channel Estimation Schemes for IEEE 802.11p Standard", Jun. 30, 2020, IEEE Access (vol. 8), pp. 113751-113765 (Year: 2020).*
Xiang et al., "Deep-Learning-Aided Joint Channel Estimation and Data Detection for Spatial Modulation", Nov. 2, 2020, IEEE Access (vol. 8), pp. 191910-191919. (Year: 2020).*

(Continued)

*Primary Examiner* — Sophia Vlahos
(74) *Attorney, Agent, or Firm* — Sughrue Mion, PLLC

(57) ABSTRACT

An electronic device includes at least one antenna, and a channel estimation and equalization module for processing a reception signal received through the at least one antenna. The channel estimation and equalization module may identify the received signal and a reference signal related to the received signal. The channel estimation and equalization module may also, via deep learning based on the received signal and the reference signal: extract features of the received signal and the reference signal, estimate a channel of the received signal, based on the extracted features, and restore a signal corresponding to the received signal.

20 Claims, 8 Drawing Sheets

(56) References Cited

U.S. PATENT DOCUMENTS

| 11,258,639 | B2 | | 2/2022 | Mahmood et al. | |
|---|---|---|---|---|---|
| 2020/0343985 | A1 | | 10/2020 | O'Shea et al. | |
| 2022/0014398 | A1 | | 1/2022 | Andrews et al. | |
| 2023/0342593 | A1 | * | 10/2023 | Sun | H04L 25/0224 |
| 2023/0362042 | A1 | * | 11/2023 | Honkala | H04L 27/26134 |

FOREIGN PATENT DOCUMENTS

| CN | 109450830 | A | * | 3/2019 | H04L 25/0204 |
|---|---|---|---|---|---|
| CN | 109921882 | A | | 6/2019 | |
| CN | 110099016 | A | | 8/2019 | |
| CN | 110266620 | A | | 9/2019 | |
| CN | 110611627 | A | | 12/2019 | |
| CN | 111431831 | A | * | 7/2020 | |
| CN | 111565160 | A | * | 8/2020 | |
| KR | 10-2015-0142770 | A | | 12/2015 | |
| KR | 10-1896085 | B1 | | 9/2018 | |
| KR | 10-1940749 | B1 | | 1/2019 | |
| KR | 10-1992053 | B1 | | 6/2019 | |
| KR | 10-2067114 | B1 | | 1/2020 | |
| KR | 10-2154481 | B1 | | 9/2020 | |
| KR | 10-2156501 | B1 | | 9/2020 | |
| WO | 2020/092391 | A1 | | 5/2020 | |

OTHER PUBLICATIONS

Ye et al., "Power of Deep Learning for Channel Estimation and Signal Detection in OFDM Systems," IEEE Wireless Communications Letters, vol. 7, No. 1, pp. 114-117, Feb. 2018.

Soltani et al., "Deep Learning-Based Channel Estimation," arXiv:1810.05893v4 [cs.IT], Total 4 pages, Feb. 2019.

Li et al., "Deep Residual Learning Meets OFDM Channel Estimation," IEEE Wireless Communications Letters, Total 4 pages, 2019.

Yi et al., "Deep Learning for Joint Channel Estimation and Signal Detection in OFDM Systems," arXiv:2008.03977v1 [cs.IT], Total 5 pages, Aug. 2020.

Bahn et al., "MTCNet: Multi-Task Complex Network for Concurrent Channel Estimation and Equalization," 2021 IEEE Global Communications Conference, Total 6 pages, 2021.

Communication dated Jun. 2, 2022, issued by the International Searching Authority in counterpart International Application No. PCT/KR2022/002858 (PCT/ISA/210).

Communication dated Jun. 2, 2022, issued by the International Searching Authority in counterpart International Application No. PCT/KR2022/002858 (PCT/ISA/237).

Communication dated Jan. 26, 2026 issued by the Korean Ministry of Intellectual Property in Korean Patent Application No. 10-2021-0174176.

* cited by examiner

ELECTRONIC DEVICE FOR PROCESSING WIRELESS SIGNAL, AND OPERATING METHOD THEREFOR

CROSS-REFERENCE TO RELATED APPLICATIONS

This application is a bypass continuation application of International Patent Application No. PCT/KR2022/002858, filed on Feb. 28, 2022, which is based on and claims priority to Korean Patent Applications Nos. 10-2021-0048011 and 10-2021-0174176, respectively filed on Apr. 13, 2021 and Dec. 7, 2021 with the Korean Intellectual Property Office, the disclosures of each of which are incorporated by reference herein in their entireties.

BACKGROUND

1. Field

The disclosure relates to a method and device for processing a wireless signal in an electronic device of a wireless communication system.

2. Description of Related Art

A wireless communication system may provide wireless communication while securing activity of an electronic device (or a user). For example, a transmission device and a reception device of a wireless communication system may transmit and/or receive a signal (or data) via a wireless channel.

In a wireless communication environment, the state of a wireless channel may irregularly change. Accordingly, the reception device may perform channel estimation in order to determine the degree of distortion of a signal received via the wireless channel, and may decode, based on the estimated channel value, the received signal into a signal (or data) transmitted by a transmission device.

SUMMARY

A reception device of a wireless communication system may decode, based on a channel estimation value, a received signal into a signal (or data) transmitted by a transmission device, and may sequentially perform a channel estimation operation and a signal decoding operation. Accordingly, in case that estimation of a channel fails, the reception device may be restricted to perform decoding so as to obtain the signal (or data) transmitted by the transmission device.

The disclosure relates to a method and device for processing a wireless signal in an electronic device of a wireless communication system.

In accordance with certain embodiments of the present disclosure, an electronic device may include at least one antenna, and a channel estimation and equalization module configured to process a received signal received via the at least one antenna. The channel estimation and equalization module may be configured to identify the received signal and a reference signal related to the received signal. The channel estimation and equalization module may be further configured to, via deep learning based on the received signal and the reference signal: extract features of the received signal and the reference signal, estimate a channel of the received signal, based on the extracted features, and restore a signal corresponding to the received signal.

In accordance with certain embodiments of the present disclosure, an operation method of an electronic device may include identifying a received signal, received via at least one antenna, and a reference signal related to the received signal. The operation method may further include, via deep learning based on the received signal and the reference signal: extracting features of the received signal and the reference signal, estimating a channel of the received signal, based on the extracted features, and restoring a signal corresponding to the received signal.

According to various embodiments of the disclosure, an electronic device of a wireless communication system performs channel estimation and signal decoding by applying a received signal to a deep learning model, and thus may decode a signal to be adapted for various wireless environments.

BRIEF DESCRIPTION OF THE DRAWINGS

The above and other aspects and features of certain embodiments of the present disclosure will be more apparent from the following description taken in conjunction with the accompanying drawings, in which:

FIG. 2 is a block diagram of a wireless communication system, according to various embodiments of the disclosure;

FIG. 3 is a block diagram of a channel estimation and equalization module in an electronic device, according to various embodiments of the disclosure;

FIG. 5 is a block diagram of a deep-learning module, according to various embodiments of the disclosure;

DETAILED DESCRIPTION

Hereinafter, various embodiments will be described in detail with reference to attached drawings.

Figure 1:
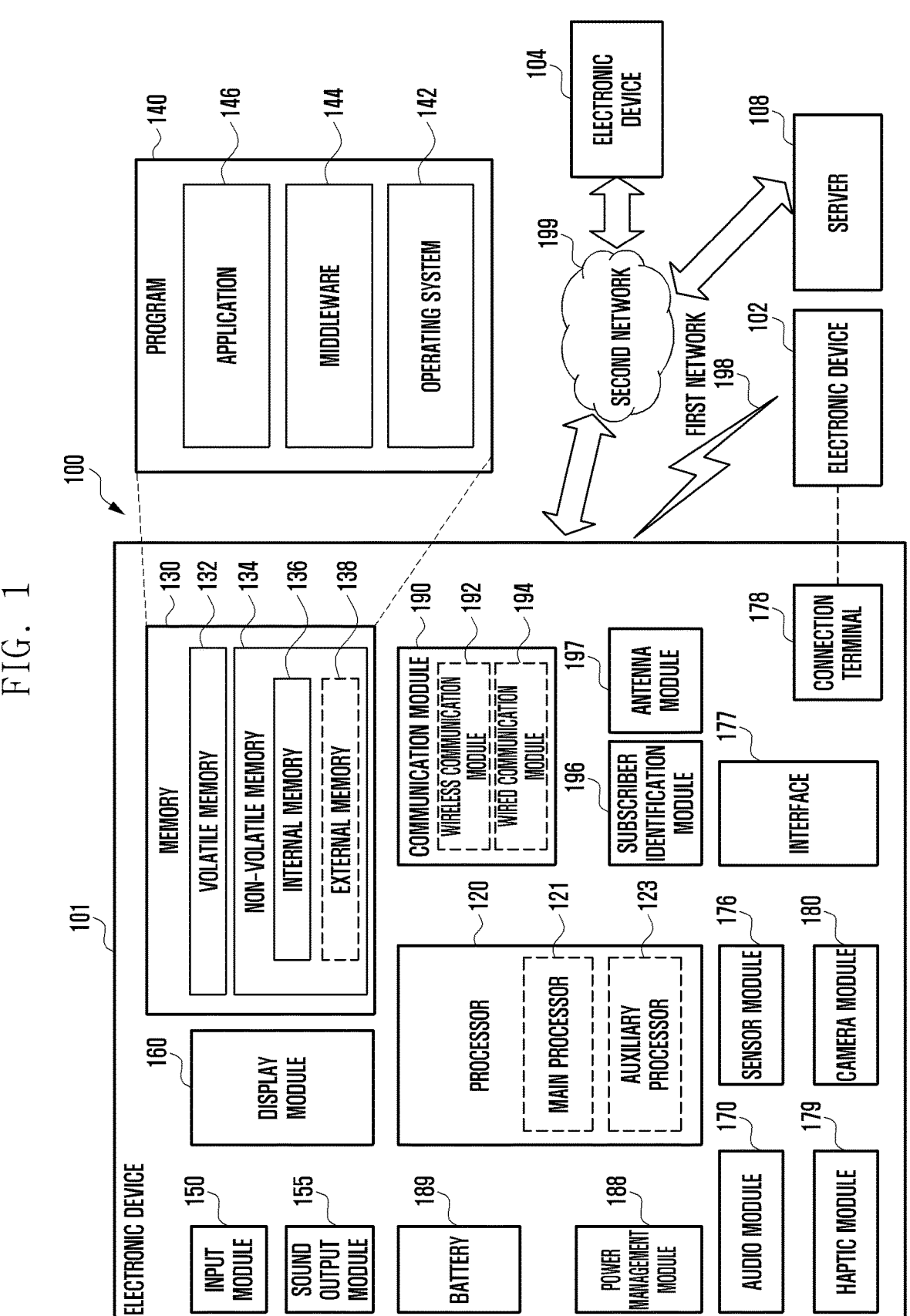
FIG. 1 is a block diagram illustrating an electronic device in a network environment, according to various embodiments of the disclosure.

FIG. 1 is a block diagram illustrating an example electronic device 101 in a network environment 100, according to various embodiments of the disclosure. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module

176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
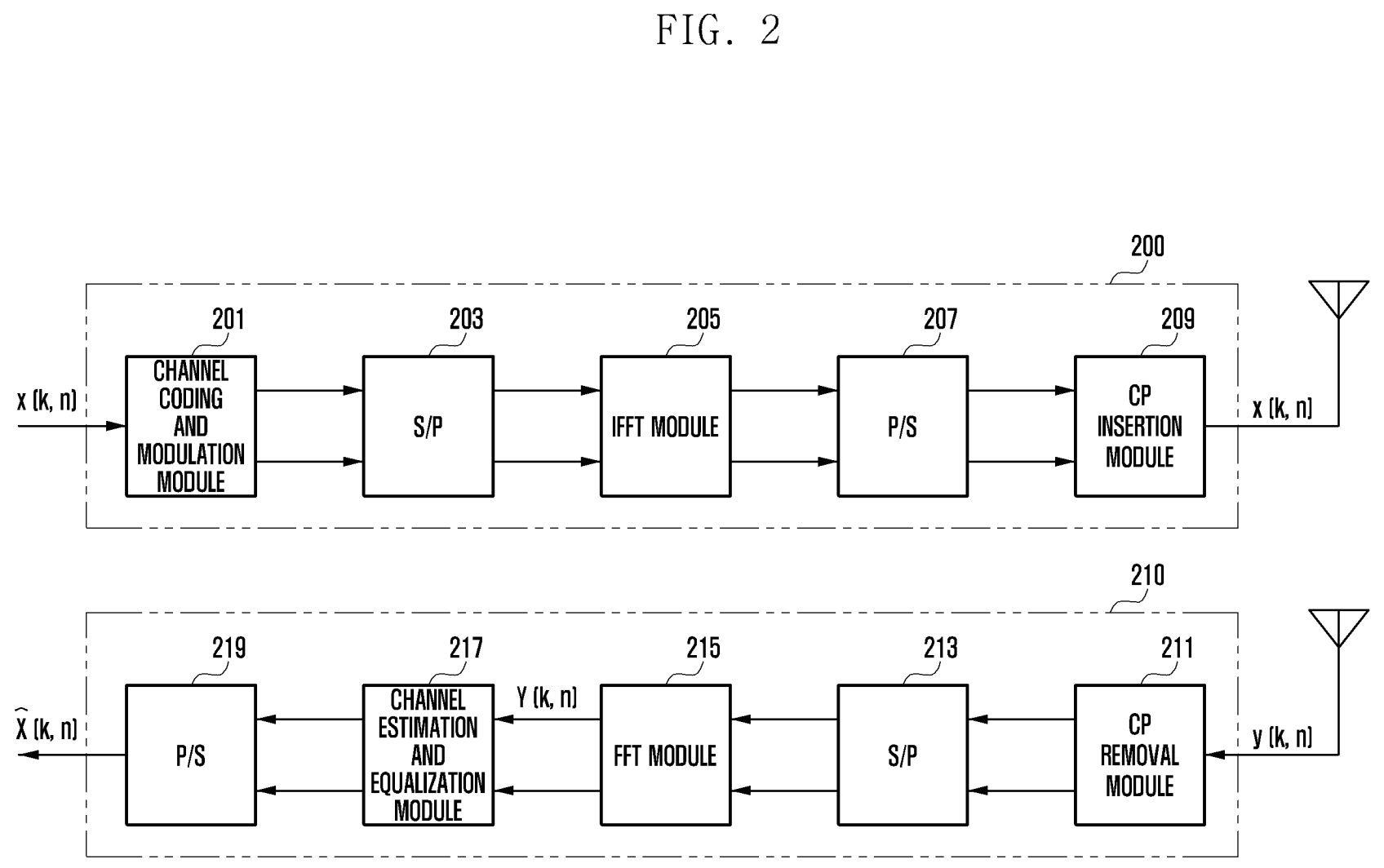

FIG. 2 is a block diagram of a wireless communication system, according to various embodiments of the disclosure.

According to various embodiments with reference to FIG. 2, a wireless communication system may include a transmission device 200 for transmitting a signal and a reception device 210 for receiving a signal. According to an embodiment, the transmission device 200 may include a base station or a user equipment (UE) that transmits a signal and/or data via a radio resource. The reception device 210 may include a UE or a base station that receives a signal and/or data from the transmission device 200 via a radio resource. For example, the reception device 210 may include the electronic device 101 of FIG. 1.

According to various embodiments, the transmission device 200 may include a channel coding and modulation module 201, a serial to parallel (S/P) conversion module (serial to parallel convertor) 203, an inverse fast Fourier transform (IFFT) module 205, a parallel to serial (P/S) conversion module (parallel to serial convertor) 207, and a cyclic prefix (CP) insertion module (cyclic prefix insertion) 209.

According to various embodiments, the channel coding and modulation module 201 may encode a signal (or data) (e.g., X(k, n)) to be transmitted to the reception device 210 according to a designated channel coding scheme. The channel coding and modulation module 201 may produce modulated symbols by modulating an encoded signal (or data) according to a designated modulation scheme (e.g., quadrature phase shift keying (QPSK) or quadrature amplitude modulation (QAM)). For example, a signal (or data) to be transmitted to the reception device 210 may include at least one reference signal (e.g., a pilot signal) inserted into a designated location.

According to various embodiments, the S/P conversion module 203 may produce N parallel symbol streams by converting (e.g., demultiplexing) serial symbols, modulated in the channel coding and modulation module 201, into parallel data. For example, N may correspond to the size of the inverse fast Fourier transform module 205.

According to various embodiments, the inverse fast Fourier transform module 205 may produce a signal in the time domain by performing an inverse fast Fourier operation on N parallel symbol streams converted by the S/P conversion module 203.

According to various embodiments, the P/S conversion module 207 may produce a serial time-domain signal by converting (multiplexing) a time-domain output symbol output from the inverse fast Fourier transform module 205.

According to various embodiments, the CP insertion module 209 may insert a cyclic prefix (CP) to a time-domain signal provided from the P/S conversion module 207. According to an embodiment, the CP insertion module 209 may copy at least a part of the last part of the time-domain signal provided from the P/S conversion module 207 and may add the same to the front part of the time-domain signal.

According to various embodiments, the transmission device 200 may up-convert a signal (or data) to which a CP is inserted by the CP insertion module 209 into a radio frequency (RF) signal to be transmitted via a wireless channel. The transmission device 200 may output an RF signal (e.g., x(k, n)) to the outside via at least one antenna.

According to various embodiments, the reception device 210 (e.g., the electronic device 101 of FIG. 1) may include a CP removal module 211, an S/P conversion module 213, a fast Fourier transform (FFT) module 215, a channel estimation and equalization module 217, and a P/S conversion module 219. According to an embodiment, the CP removal module 211, the S/P conversion module 213, the fast Fourier transform (FFT) module 215, the channel estimation and equalization module 217, and the P/S conversion module 219 may be substantially the same as the wireless communication module 192 of FIG. 1, or may be included in the wireless communication module 192. According to an embodiment, the channel estimation and equalization module 217 may be substantially the same as a communication processor (CP), or may be included in the communication processor.

According to various embodiments, the reception device 210 may down-convert an RF signal (e.g., y(k, n)) received via at least one antenna, and may produce a baseband signal.

According to various embodiments, the CP removal module 211 may remove a CP from a baseband signal, and may produce a serial time-domain signal.

According to various embodiments, the S/P conversion module 213 may produce N parallel symbol streams by converting (e.g., demultiplexing) a serial time-domain signal, produced by the CP removal module 211, into parallel data.

According to various embodiments, the fast Fourier transform module 215 may produce a signal (e.g., Y(k, n)) in the frequency domain by performing a fast Fourier operation on N parallel symbol streams converted by the S/P conversion module 213.

According to various embodiments, the channel estimation and equalization module 217 may obtain channel information of a received signal and may restore a signal via deep learning based on a frequency-domain signal produced by the fast Fourier transform module 215. According to an embodiment, via a neural network (e.g., a convolution neural network (CNN)) that uses a received signal and a pilot signal included in the received signal as inputs, the channel estimation and equalization module 217 may restore channel information of the received signal and a transmitted signal corresponding to the received signal.

According to various embodiments, the P/S conversion module 219 may convert (e.g., multiplex) a signal restored by the channel estimation and equalization module 217, and may produce a serial frequency-domain signal (e.g., x̂(k,n)).

Figure 3:
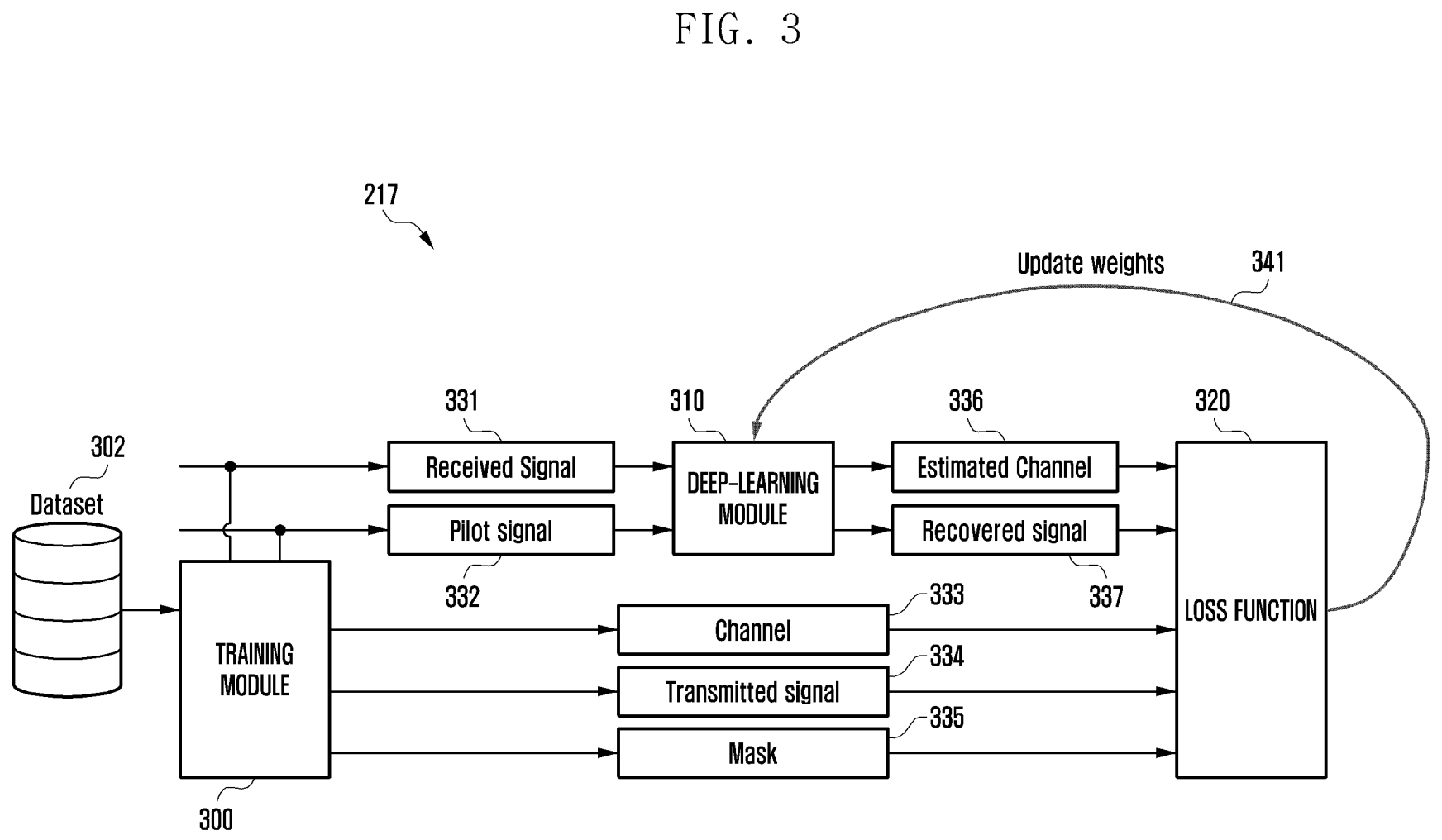

FIG. 3 is a block diagram of the channel estimation and equalization module 217 in an electronic device, according to various embodiments of the disclosure.

According to various embodiments with reference to FIG. 3, the channel estimation and equalization module 217 may include a training module (training scheme) 300, a deep-learning module 310, and a loss function (or a loss management module) 320.

According to various embodiments, in the state in which the electronic device 101 (e.g., the reception device 210 of FIG. 2) does not communicate with an external electronic device (e.g., the transmission device 200 of FIG. 2), the training module 300 may provide a training signal (e.g., a received signal 331) and/or a pilot signal 332 for training the deep-learning module 310. According to an embodiment, based on signals stored in a data set 302, the training module 300 may produce training signals having various sizes (e.g., different sizes). In order to decrease a learning error of the deep-learning module 310, the training module 300 may convert training signals having various sizes to have the same size, and may provide the same to the deep-learning module 310. For example, the training module 300 may convert training signals having various sizes to have the same size according to a zero padding scheme. For example, the zero padding scheme may include a series of operations of filling each training signal with a reference value (e.g., '0') so that the training signals having various sizes have a reference size. For example, the part of a training signal filled with a reference value may be referred to as a mask. For example, a reference size may include the size of a resource block (RB) defined in a wireless communication system, or the size of the largest training signal among the training signals.

According to various embodiments, in the state in which the electronic device 101 (e.g., the reception device 210 of FIG. 2) does not communicate with an external electronic device (e.g., the transmission device 200 of FIG. 2), the deep-learning module 310 may perform learning based on a training signal (e.g., a received signal 331) and/or a pilot signal 332 provided from the training module 300. For example, the deep-learning module 310 may be embodied as a neural network architecture. For example, the deep-learning module 310 may perform learning during a time (e.g., in user's sleep) when the electronic device 101 is relatively less frequently used. According to an embodiment, the deep-learning module 310 may extract features of a training signal (e.g., the received signal 331) and/or the pilot signal 332 via a feature extraction module (feature extractor). Based on the features of the training signal extracted by the feature extraction module, the deep-learning module 310 may detect a channel 336 (or an estimated channel) of the training signal and a restored signal (recovered signal) 337 (or a transmitted signal) corresponding to the training signal. For example, the pilot signal 332 may include a reference signal defined in advance between the electronic device 101 (e.g., the reception device 210 of FIG. 2) and an external electronic device (e.g., the transmission device 200 of FIG. 2) in order to estimate a channel between the electronic device 101 (e.g., the reception device 210 of FIG. 2) and the external electronic device (e.g., the transmission device 200 of FIG. 2).

According to various embodiments, a loss function 320 may detect errors of the recovered signal 337 and the channel 336 of the training signal detected by the deep-learning module 310. According to an embodiment, in the state in which the electronic device 101 (e.g., the reception device 210 of FIG. 2) does not communicate with an external electronic device (e.g., the transmission device 200 of FIG. 2), the loss function 320 may detect an error of an output signal associated with learning performed by the deep-learning module 310. According to an embodiment, the loss function 320 may obtain information associated with a channel 333 corresponding to a training signal provided from the training module 300 (or the data set 302) to the deep-learning module 310, a transmitted signal (transmitted signal) 334, and/or a mask 335 corresponding to a training signal. Based on the channel 333 obtained from the training module 300 (or data set 302), the transmitted signal 334, and/or the mask 335 corresponding to a training signal, the loss function 320 may detect errors (e.g., a channel estimation error, a signal restoration error, and/or a noise reduction error) of the recovered signal 337 and the channel 336 of the training signal detected by the deep-learning module 310. According to an embodiment, based on the errors of the recovered signal 337 and the channel 336 of the training signal detected by the deep-learning module 310, the loss function 320 may update a weight (or a learning weight) of the deep-learning module 310 (operation 341).

According to various embodiments, in case that the electronic device 101 (e.g., the reception device 210 of FIG. 2) communicates with an external electronic device (e.g., the transmission device 200 of FIG. 2), the deep-learning module 310 may detect the channel 336 of a signal received from the external electronic device (e.g., the transmission device 200 of FIG. 2) and the recovered signal 337 via a neural network trained by a training signal. According to an embodiment, the deep-learning module 310 may extract, via a feature extraction module (feature extractor), features of the received signal 331 received from an external electronic device (e.g., the transmission device 200 of FIG. 2) and/or the pilot signal 332 included in the received signal 331. Based on the features of the received signal 331 and/or the pilot signal 332 extracted via the feature extraction module, deep-learning module 310 may detect the channel 336 of the received signal 331 and the recovered signal 337.

Figure 4:
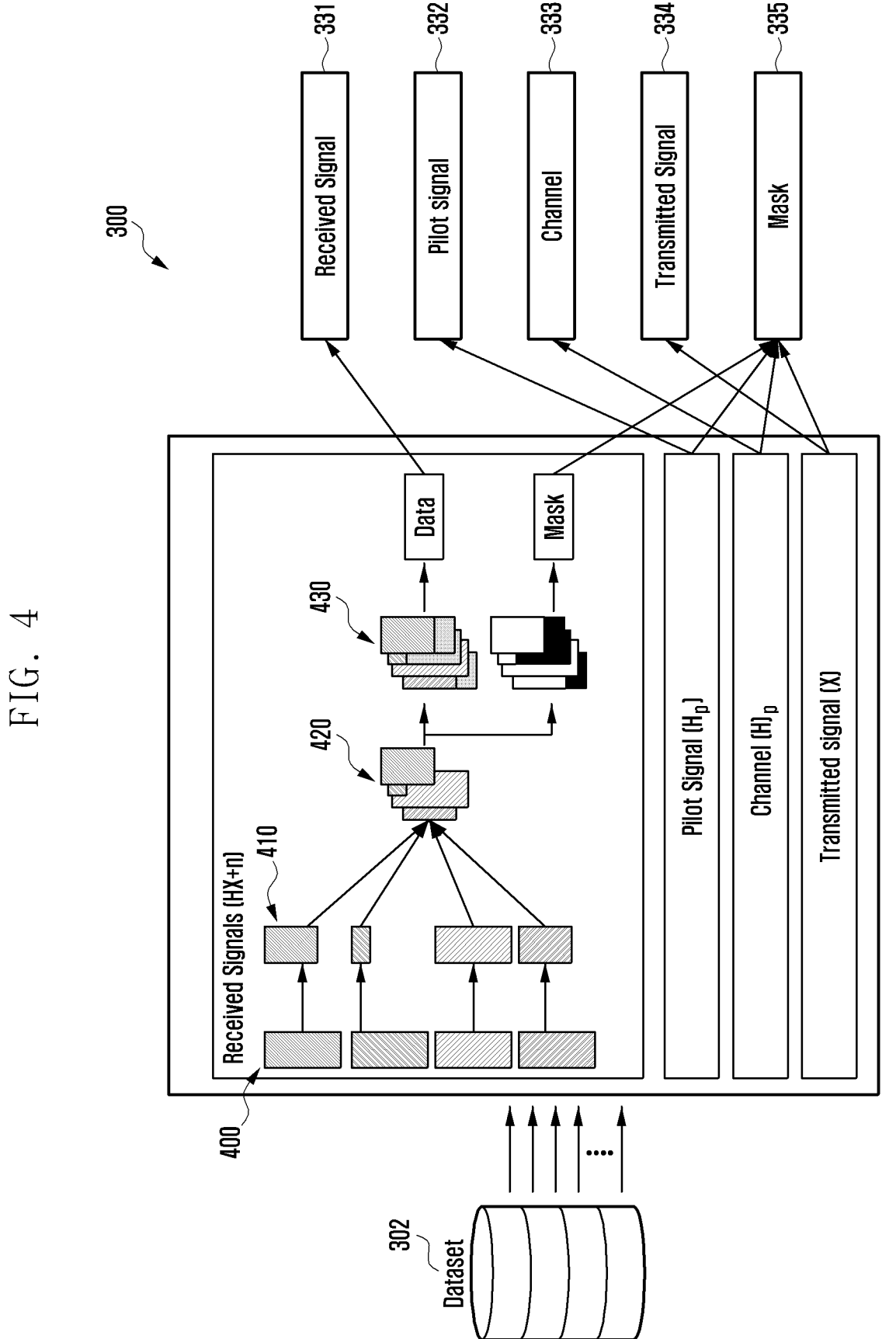
FIG. 4 is a block diagram of a training module, according to various embodiments of the disclosure.

FIG. 4 is a block diagram of the training module 300, according to various embodiments of the disclosure.

According to various embodiments with reference to FIG. 4, the training module 300 of the channel estimation and equalization module 217 may produce training signals in various shapes (or sizes) for training the deep-learning module 310. According to an embodiment, the training module 300 may randomly crop signals 400 stored in the data set 302 so as to produce training signals 410 having various sizes.

According to various embodiments, the training module 300 may convert the training signals 410 having various sizes to have the same size. According to an embodiment, the training module 300 may collect the various sizes of training signals 410 obtained via random cropping (operation 420). The training module 300 may convert the training signals having various sizes to have the same size in order to decrease a learning error of the deep-learning module 310 (operation 430). For example, the training module 300 may convert the size of a training signal input into the deep-learning module 310 to have the same size via the deep-learning module 310 that uses a stochastic gradient descent scheme (operation 430). For example, the training module 300 may add a reference value (e.g., '0') to each training signal so that the training signals correspond to a reference size according to the zero padding scheme. For example, a part filled with a reference value in a training signal may be referred to as a mask. For example, the stochastic gradient descent scheme may include a neural network learning method that performs feedforward (feed forward) for each batch including at least part of all signals (or the entire data) input to the deep-learning module 310, so as to decrease an error.

According to various embodiments, the training module 300 may provide the converted training signals 331 having the same size and the pilot signals 332 to the deep-learning module 310.

According to various embodiments, the training module 300 may provide, to the loss function 320, information associated with the channel 333 corresponding to the training signal 331, the transmitted signal 334, and/or the mask 335 corresponding to a training signal.

Figure 5:
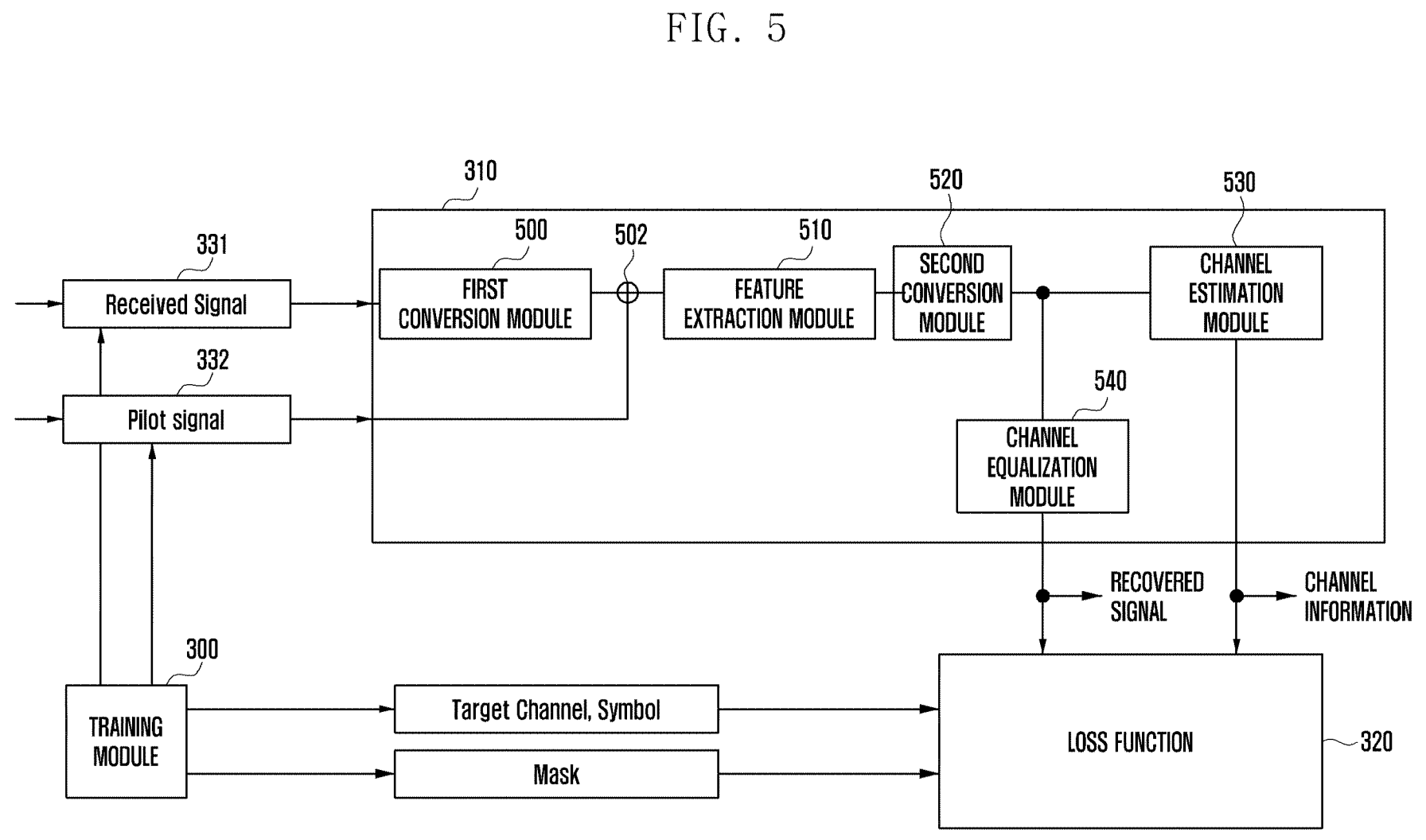

FIG. 5 is a block diagram of the deep-learning module 310, according to various embodiments of the disclosure.

According to various embodiments with reference to FIG. 5, the deep-learning module 310 may include a first conversion module 500, a combination module 502, a feature extraction module 510, a second conversion module 520, a channel estimation module 530, and/or a channel equalization module 540. For example, the deep-learning module 310 may be embodied as a neural network architecture (e.g., a convolution neural network (CNN)).

According to various embodiments, the first conversion module 500 may perform down-sampling (down-sample) of an input signal of the deep-learning module 310. According to an embodiment, the first conversion module 500 may reduce the size of the received signal 331 to correspond to a size of the pilot signal 332. For example, the size of the received signal 331 may be down-sampled to correspond to the size of the pilot signal 332 via pixel shuffle. For example, in case that the received signal 331 has a size of 1×72×14 in the three-dimensional space, the received signal 331 may be down-sampled to have a size of 14×36×2 based on the pilot signal 332 having a size of 1×36×2.

According to various embodiments, the combination module 502 may combine the received signal down sampled by the first conversion module 500 and the pilot signal 332 into a single signal. For example, the combination module 502 may apply at least one of summing (sum), concatenation (concatenate), or convolution to the received signal down-sampled by the first conversion module 500 and the pilot signal 332, so as to produce a single signal. For example, the received signal 331 may include a signal received from an external electronic device (e.g., the transmission device 200) via at least one antenna, or a training signal produced by the training module 300. For example, the pilot signal 332 may include a pilot signal included in a signal received from an external electronic device (e.g., the transmission device 200) via at least one antenna, or a pilot signal corresponding to a training signal produced by the training module 300.

According to various embodiments, the feature extraction module 510 may extract a feature from a signal provided from the combination module 502. For example, the feature extraction module 510 may include at least one among depthwise separable convolution (e.g., DSConv2D), a residual channel attention block (RCAB), a layer attention block (LAM), or a channel spatial attention block (CSAM). For example, the depthwise separable convolution may reduce the number of parameters for the basic convolution. For example, the RCAB may detect important channel information from values having three-dimensional sizes including a channel (c), a height (h), and a width (w) provided via the depthwise separable convolution. For example, the CSAM may detect a relationship between a random value among the values having three-dimensional sizes of a channel (c), a height (h), and a weight (w), and other values in the three dimensions. For example, the LAM may detect information related to relevancy between a height and a width among the values having three-dimensional sizes of a channel (c), a height (h), and a weight (w).

According to various embodiments, the second conversion module 520 may perform up-sampling (upsample) of an output signal of the feature extraction module 510. According to an embodiment, via pixel shuffle, the second conversion module 520 may restore the size of an output signal of the feature extraction module 510 to a previous size that is before being down-sampled by the first conversion module 500.

According to various embodiments, based on the features of the received signal 331 and the pilot signal 332 that are detected by the feature extraction module 510 and are provided via the second conversion module 520, the channel estimation module 530 may estimate a channel of the received signal 331.

According to various embodiments, based on the features of the received signal 331 and the pilot signal 332 that are detected by the feature extraction module 510 and are provided via the second conversion module 520, the channel equalization module 540 may restore a transmitted signal corresponding to the received signal 331.

Figure 6:
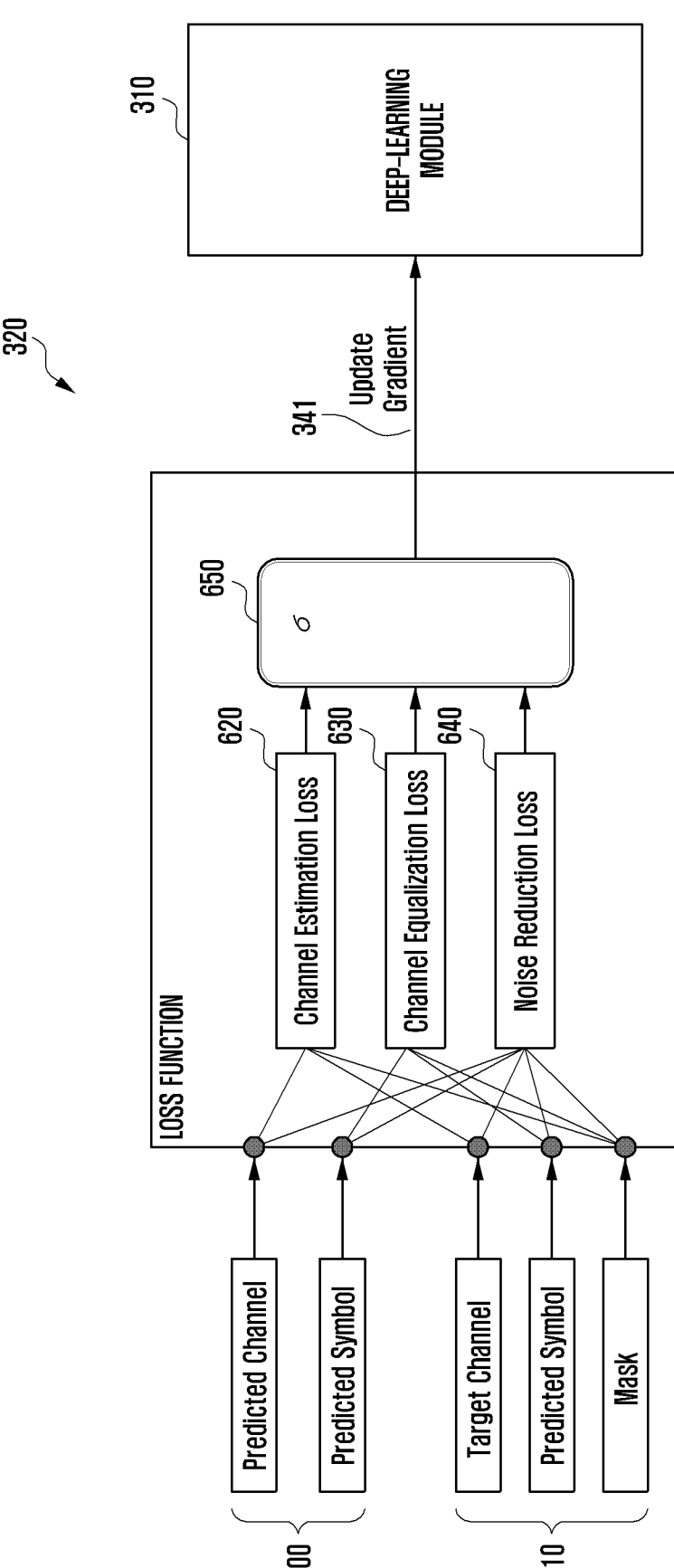
FIG. 6 is a block diagram of a loss function, according to various embodiments of the disclosure.

FIG. 6 is a block diagram of the loss function 320, according to various embodiments of the disclosure.

According to various embodiments with reference to FIG. 6, the loss function 320 may estimate losses (or errors) of a recovered (or demodulated) signal and an estimated channel obtained from the deep-learning module 310. According to an embodiment, in case that deep-learning module 310 performs learning, the loss function 320 may obtain information 610 related to a channel (target channel) corresponding to a training signal provided from the training module 300 (or the data set 302) to the deep-learning module 310, a transmitted signal (predicted symbol), and/or a mask corresponding to a training signal. Based on the channel obtained from the training module 300 (or the data set 302), the transmitted signal, and/or the mask corresponding to a training signal, the loss function 320 may detect errors (or losses) of a recovered signal (predicted symbol) 600 and a channel (predicted channel) of a training signal detected by the deep-learning module 310. For example, based on the channel obtained from the training module 300 (or the data set 302), the mask corresponding to the training signal, and the channel of the training signal detected from the deep-learning module 310, the loss function 320 may detect the average of errors between the channel obtained from the training module 300 (or the data set 302) and the channel of the training signal detected by the deep-learning module 310 (operation 620). For example, the channel error average may include the average value of channel errors detected during a predetermined period of time. For example, based on a transmitted signal obtained from the training module 300 (or the data set 302), a mask corresponding to a training signal, and a recovered signal detected from the deep-learning module 310, the loss function 320 may detect the average of restoration errors between the transmitted signal obtained from the training module 300 (or the data set 302) and the signal detected in deep-learning module 310 (operation 630). For example, the signal restoration error average may include the average value of errors of recovered signals detected during a designated period of time. For example, based on a channel obtained from the training module 300 (or the data set 302), a transmitted signal, a mask corresponding to a training signal, and a channel of a training signal and a recovered signal detected by the deep-learning module 310, the loss function 320 may detect a noise reduction error (operation 640). For example, the noise reduction error may be used to reduce an imbalanced learning incurred between a channel estimation error and a signal restoration error.

According to an embodiment, based on errors (or losses) 620, 630, and 640 of a recovered (or demodulated) signal and an estimated channel obtained from the deep-learning module 310, the loss function 320 may update a weight (or a learning weight) to reduce a learning error of the deep-learning module 310 (operation 650). For example, the updated weight may be obtained by applying, to a previous weight, differential values of errors (or losses) 620, 630, and 640 of a recovered (or demodulated) signal and an estimated channel from the deep-learning module 310.

According to various embodiments, an electronic device (e.g., the electronic device 101 of FIG. 1 or the reception device 210 of FIG. 2) may include at least one antenna (e.g., the antenna module 197 of FIG. 1), and a channel estimation and equalization module (e.g., the processor 120 of FIG. 1 or the channel estimation and equalization module 217 of FIG. 2). The channel estimation and equalization module may be configured to identify the received signal and a reference signal related to the received signal. The channel estimation and equalization module may be further configured to, via deep learning based on the received signal and the reference signal: extract features of the received signal and the reference signal, estimate a channel of the received signal, based on the extracted features, and restore a signal corresponding to the received signal.

According to various embodiments, the channel estimation and equalization module may produce a plurality of training signals having different sizes during a period when signal communication is not performed via the at least one antenna, may perform deep learning, based on the plurality of training signals and on pilot signals corresponding to the plurality of training signals, may detect an error of the deep learning via a result of performing of the deep learning, and may update a weight of the deep learning for the channel estimation and signal restoration, based on the error of the deep learning.

According to various embodiments, the channel estimation and equalization module may convert the plurality of training signals having different sizes to converted training signals corresponding to a reference size, and may perform deep learning, based on the converted training signals and on the pilot signals.

According to various embodiments, the channel estimation and equalization module may detect the pilot signals corresponding to the plurality of training signals, based on the plurality of training signals, and detect a channel estimation error, a signal restoration error, and a noise reduction error, based on the result of performing of the deep learning.

According to various embodiments, the channel estimation and equalization module may update the weight of the deep learning, based on the channel estimation error, the signal restoration error, and the noise reduction error.

According to various embodiments, the channel estimation and equalization module may include a neural network configured to perform the channel estimation and signal restoration.

According to various embodiments, the neural network may include a first conversion module (e.g., the first conversion module 500 of FIG. 5) configured to perform down-sampling of a size of the received signal, based on a size of a corresponding pilot signal, a combination module (e.g., the combination module 502 of FIG. 5) configured to combine the down-sampled received signal and the corresponding pilot signal into a combined signal, a feature extraction module (e.g., the feature extraction module 510 of FIG. 5) configured to extract a feature of the combined signal, a second conversion module (e.g., the second conversion module 520 of FIG. 5) configured to configured to perform up-sampling of an output signal of the feature extraction module to have the size of the received signal, a channel estimation module (e.g., the channel estimation module 530 of FIG. 5) configured to estimate the channel of the received signal, based on a feature of the up-sampled signal, and a channel equalization module (e.g., the channel equalization module 540 of FIG. 5) configured to restore a signal corresponding to the received signal, based on the feature of the up-sampled signal.

According to various embodiments, the feature extraction module may include at least one of a depthwise separable convolution (e.g., DSConv2D), a residual channel attention block (RCAB), a layer attention block (LAM), or a channel spatial attention block (CSAM).

According to various embodiments, the first conversion module may perform down-sampling of the size of the received signal via pixel shuffle, based on the size of the corresponding pilot signal.

According to various embodiments, the second conversion module may perform the up-sampling of the output signal via pixel shuffle.

Figure 7:
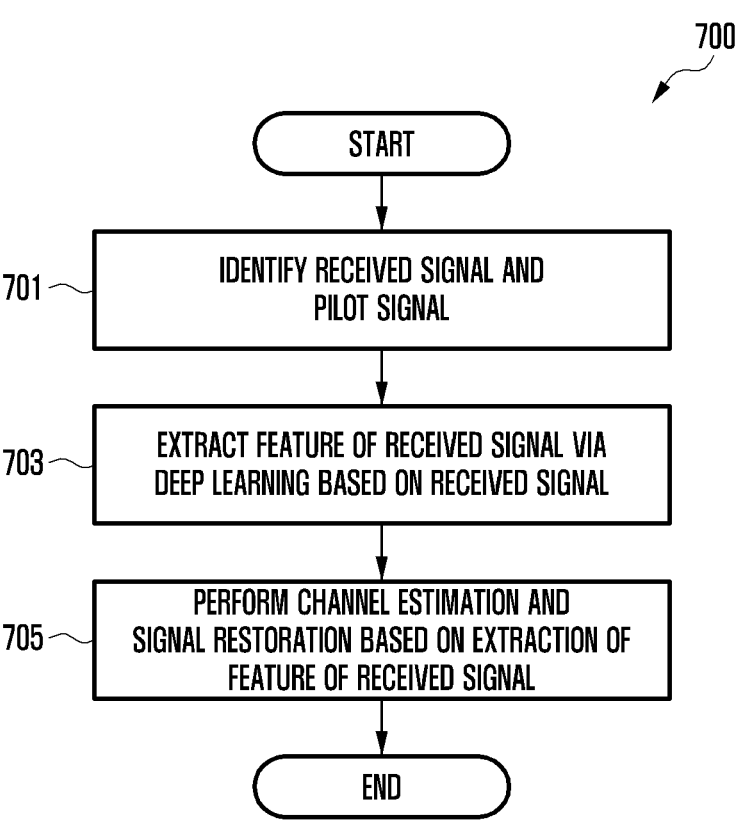
FIG. 7 is a flowchart illustrating a method of channel estimation and equalization by an electronic device, according to various embodiments of the disclosure.

FIG. 7 is a flowchart illustrating a method 700 of channel estimation and equalization in an electronic device, according to various embodiments of the disclosure. In the illustrated method 700, operations may be performed sequentially, but embodiments are not limited thereto. For example, the order of operations may be changed, and at least two operations may be performed in parallel. According to an embodiment, the electronic device used in the method 700 of FIG. 7 may be the electronic device 101 of FIG. 1 or the reception device 210 of FIG. 2.

According to various embodiments with reference to FIG. 7, the electronic device (e.g., the processor 120 of FIG. 1 and/or the channel estimation and equalization module 217 of FIG. 2) may identify a received signal and a pilot signal related to the received signal in operation 701. For example, the received signal may include a signal received from an external electronic device (e.g., the transmission device 200) via at least one antenna, or a training signal produced by the training module 300. For example, a pilot signal may include a pilot signal included in a signal received from an external electronic device (e.g., the transmission device 200) via at least one antenna, or a pilot signal corresponding to a training signal produced by the training module 300.

According to various embodiments, the electronic device (e.g., the processor 120 of FIG. 1 and/or the channel estimation and equalization module 217 of FIG. 2) may extract a feature of a received signal and/or pilot signal via deep learning based on the received signal and/or pilot signal in operation 703. According to an embodiment, the channel estimation and equalization module 217 may perform down-sampling of a received signal to correspond to the size of a pilot signal by using the first conversion module 500. The channel estimation and equalization module 217 may combine the down-sampled received signal and the pilot signal into a single signal by using the combination module 502. The channel estimation and equalization module 217 may extract, using the feature extraction module 510, a feature from a signal (e.g., the signal obtained via combination of the received signal and the pilot signal) provided from the combination module 502. For example, the feature extraction module 510 may extract a feature from a signal (e.g., the signal obtained via combination of the received signal and the pilot signal) provided from the combination module 502 via at least one of a depthwise separable convolution (e.g., DSConv2D), an RCAB, an LAM, or a CSAM.

According to various embodiments, in operation 705, based on the feature of the received signal and/or pilot signal extracted via deep learning, the electronic device (e.g., the processor 120 of FIG. 1 and/or the channel estimation and equalization module 217 of FIG. 2) may estimate a channel of the received signal and may restore a transmitted signal corresponding to the received signal. According to an embodiment, the channel estimation and equalization module 217 may perform up-sampling of an output signal of the feature extraction module 510 via the second conversion module 520. According to an embodiment, based on the features of the received signal 331 and the pilot signal 332 that are detected by the feature extraction module 510 and are provided from the second conversion module 520, the channel estimation and equalization module 217 may estimate a channel of the received signal 331 by using the channel estimation module 530. According to an embodiment, based on the features of the received signal 331 and the pilot signal 332 that are detected by the feature extraction module 510 and are provided from the second conversion module 520, the channel estimation and equalization module 217 may restore a transmitted signal corresponding to the received signal 331 by using the channel equalization module 540.

Figure 8:
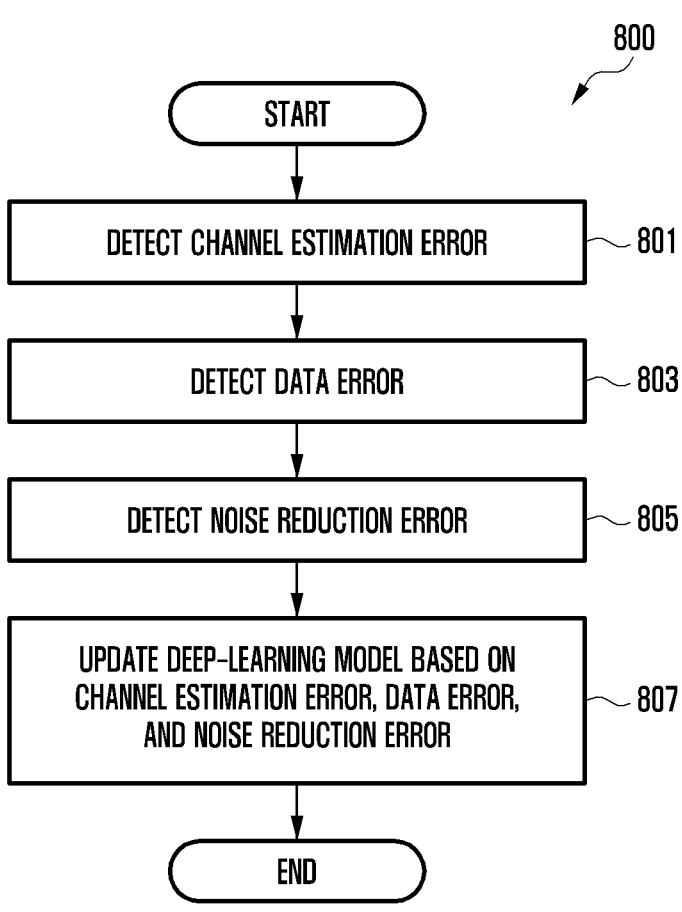
FIG. 8 is a flowchart illustrating a method of applying of a loss function in an electronic device, according to various embodiments of the disclosure.

FIG. 8 is a flowchart illustrating a method 800 of applying a loss function in an electronic device, according to various embodiments of the disclosure. In the illustrated method

800, operations may be performed sequentially, but embodiments are not limited thereto. For example, the order of operations may be changed, and at least two operations may be performed in parallel. According to an embodiment, the electronic device used in the method 800 of FIG. 8 may be the electronic device 101 of FIG. 1 or the reception device 210 of FIG. 2.

According to various embodiments with reference to FIG. 8, in case that it is determined that the deep-learning module 310 performs learning, an electronic device (e.g., the processor 120 of FIG. 1 and/or the channel estimation and equalization module 217 of FIG. 2) may detect a channel estimation error of the deep-learning module 310 in operation 801. According to an embodiment, based on a channel obtained from the training module 300 (or the data set 302), a mask corresponding to a training signal, and the channel of a training signal detected from the deep-learning module 310, the loss function 320 of the channel estimation and equalization module 217 may detect the average of errors between the channel obtained from the training module 300 (or the data set 302) and the channel of the training signal detected by the deep-learning module 310 (operation 620). For example, the channel error average may include the average value of channel errors detected during a predetermined period of time.

According to various embodiments, the electronic device (e.g., the processor 120 of FIG. 1 and/or the channel estimation and equalization module 217 of FIG. 2) may extract an error of a signal (or data) restored in deep-learning module 310 in operation 803. According to an embodiment, based on a transmitted signal obtained from the training module 300 (or the data set 302), a mask corresponding to a training signal, and a recovered signal detected in the deep-learning module 310, the loss function 320 of the channel estimation and equalization module 217 may detect the average of restoration errors between the transmitted signal obtained from the training module 300 (or the data set 302) and the signal detected in the deep-learning module 310 (operation 630). For example, the signal restoration error average may include the average value of errors of recovered signals (or data) detected during a designated period of time.

According to various embodiments, the electronic device (e.g., the processor 120 of FIG. 1 and/or the channel estimation and equalization module 217 of FIG. 2) may detect a noise reduction error of the deep-learning module 310 in operation 805. According to an embodiment, the channel estimation and equalization module 217 may intensively perform learning to reduce a signal restoration error since the single restoration error is relatively higher than a channel estimation error. Accordingly, the loss function 320 of the channel estimation and equalization module 217 may apply a noise reduction error so as to remove an imbalanced learning incurred between a channel estimation error and a signal restoration error. For example, in case that learning for reducing a signal restoration error is intensively performed, a noise reduction error is relatively high due to a channel estimation error and thus, the loss function 320 may control the deep-learning module 310 to perform, based on a noise reduction error, balanced learning of a channel estimation error and a signal restoration error. For example, based on a channel obtained from the training module 300 (or the data set 302), a transmitted signal, a mask corresponding to a training signal, a channel of a training signal detected by the deep-learning module 310, and a channel of a training signal and a recovered signal detected in the deep-learning module 310, the loss function 320 may detect a noise reduction error (operation 640).

According to various embodiments, in operation 807, based on the channel estimation error, the restoration error of a recovered (or demodulated) signal, and/or the noise reduction error of the deep-learning module 310, the electronic device (e.g., the processor 120 of FIG. 1 and/or the channel estimation and equalization module 217 of FIG. 2) may produce and/or update a weight of the deep-learning module 310. For example, the weight of the deep-learning module 310 may be obtained by applying, to a previous weight, a differential value of a channel estimation error of a channel estimated in the deep-learning module 310, a signal restoration error of a recovered (or demodulated) signal, and/or a noise reduction error.

According to various embodiments, an operation method of an electronic device (e.g., the electronic device 101 of FIG. 1 or the reception device 210 of FIG. 2) may include an operation of identifying a received signal received via at least one antenna (e.g., the antenna module 197 of FIG. 1), and a reference signal related to the received signal. The operation method may further include operations, via deep learning based on the received signal and the reference signal, of: extracting features of the received signal and the reference signal, estimating a channel of the received signal, based on the extracted features, and restoring a signal corresponding to the received signal.

According to various embodiments, the method may further include an operation of producing a plurality of training signals having different sizes during a period when signal communication is not performed via the at least one antenna, an operation of performing deep learning, based on the plurality of training signals and on pilot signals corresponding to the plurality of training signals, an operation of detecting an error of the deep learning via a deep learning result, and an operation of updating a weight of deep learning for the channel estimation and signal restoration, based on the error of the deep learning.

According to various embodiments, the operation of performing the deep learning may include an operation of converting the plurality of training signals having different sizes to converted training signals corresponding to a reference size, and an operation of performing deep learning, based on the converted training signals and on the pilot signals.

According to various embodiments, the operation of detecting the error may include an operation of detecting the pilot signals corresponding to the plurality of training signals, based on the plurality of training signals, and an operation of detecting a channel estimation error, a signal restoration error, and a noise reduction error, based on a result of the deep learning.

According to various embodiments, the operation of updating of the weight may be based on the channel estimation error, the signal restoration error, and the noise reduction error.

According to various embodiments, the deep learning may be performed via a neural network.

According to various embodiments, the operation of restoring the signal may include an operation of down-sampling the size of the received signal based on the size of a corresponding pilot signal, an operation of combining the down-sampled received signal and the corresponding pilot signal into a combined signal, an operation of extracting a feature of the combined signal, an operation of up-sampling the combined signal to have the size of the received signal, an operation of estimating a channel of the received signal based on a feature of the up-sampled signal, and an operation of restoring a signal corresponding to the received signal based on the feature of the up-sampled signal.

According to various embodiments, the operation of extracting the features may include an operation of extracting a feature of the combined signal via at least one of a depthwise separable convolution (e.g., DSConv2D), a residual channel attention block (RCAB), a layer attention block (LAM), or a channel spatial attention block (CSAM).

According to various embodiments, the operation of performing down-sampling may include an operation of down-sampling the size of the received signal based on the size of the corresponding pilot signal.

According to various embodiments, the operation of performing up-sampling may be via pixel shuffle.

Embodiments of the disclosure described and illustrated herein are merely certain examples intended to easily describe the technology associated with embodiments of the disclosure and to help understanding of the disclosure, and the disclosure is not limited thereto. Therefore, in addition to the embodiments disclosed herein, the scope of the disclosure should be construed to include all modifications or modified forms drawn based on the technical idea of the various embodiments of the disclosure.

What is claimed is:

1. An electronic device comprising:
at least one antenna;
at least one processor; and
memory storing instructions,
wherein the instructions, which when executed by the at least one processor, cause the electronic device to:
receive a signal via the at least one antenna;
identify a reference signal related to the received signal; and
based on applying the received signal and the reference signal to a deep learning model stored in the electronic device:
perform channel estimation corresponding to the received signal using the deep learning model, and
perform channel equalization using the deep learning model, and
wherein the instructions, when executed by the at least one processor, further cause the electronic device to perform learning of the deep learning model such that a weight of the deep learning model is updated using a loss function that calculates a channel estimation error based on a result of the channel estimation and a signal restoration error based on a result of the channel equalization.

2. The electronic device of claim 1, wherein the instructions, when executed by the at least one processor, cause the electronic device to:
produce a plurality of training signals having different sizes during a period when signal communication is not performed via the at least one antenna;
perform the learning of the deep learning model based on the plurality of training signals and on pilot signals corresponding to the plurality of training signals;
detect an error of the deep learning model via a result of performing of the learning; and
update a weight of the deep learning model for the channel estimation and the channel equalization, based on the error of the deep learning model.

3. The electronic device of claim 2, wherein the instructions, when executed by the at least one processor, cause the electronic device to:

convert the plurality of training signals having different sizes to converted training signals corresponding to a reference size; and
perform learning of the deep learning model based on the converted training signals and on the pilot signals.

4. The electronic device of claim 2, wherein the instructions, when executed by the at least one processor, cause the electronic device to:
detect the pilot signals corresponding to the plurality of training signals, based on the plurality of training signals, and
detect a noise reduction error based on the result of performing of the learning.

5. The electronic device of claim 4, wherein the instructions, when executed by the at least one processor, cause the electronic device to update the weight of the deep learning model, based on the channel estimation error, the signal restoration error, and the noise reduction error.

6. The electronic device of claim 1, wherein the deep learning model comprises a neural network for the channel estimation and the channel equalization.

7. The electronic device of claim 6, wherein the instructions, when executed by the at least one processor, cause the electronic device to:
based on applying the received signal and the reference signal to the deep learning model:
obtain a down-sampled received signal by down-sampling of a size of the received signal based on a size of a corresponding pilot signal;
combine the down-sampled received signal and the corresponding pilot signal into a combined signal;
obtain an output signal by extracting a feature of the combined signal;
up-sampling the output signal such that the output signal matches the size of the received signal;
perform the channel estimation corresponding to the received signal based on a feature of the up-sampled signal; and
perform the channel equalization corresponding to the received signal based on the feature of the up-sampled signal.

8. The electronic device of claim 7, wherein the instructions, when executed by the at least one processor, cause the electronic device to:
extract features of the combined signal using at least one of a depthwise separable convolution, a residual channel attention block (RCAB), a layer attention block (LAM), or a channel spatial attention block (CSAM).

9. The electronic device of claim 7, wherein the instructions, when executed by the at least one processor, cause the electronic device to obtain the down-sampled received signal via pixel shuffle, based on the size of the corresponding pilot signal.

10. The electronic device of claim 7, wherein the instructions, when executed by the at least one processor, cause the electronic device to perform the up-sampling of the output signal via pixel shuffle.

11. An operation method of an electronic device, the method comprising:
receiving a signal via at least one antenna of the electronic device;
identifying a reference signal related to the received signal; and
based on applying the received signal and the reference signal to a deep learning model stored in the electronic device:

performing channel estimation corresponding to the received signal using the deep learning model, and performing channel equalization corresponding to the received signal using the deep learning model, wherein the method further comprises performing learning of the deep learning model such that a weight of the deep learning model is updated using a loss function that calculates a channel estimation error based on a result of the channel estimation and a signal restoration error based on a result of the channel equalization.

12. The method of claim 11, further comprising:

producing a plurality of training signals having different sizes during a period when signal communication is not performed via the at least one antenna;

performing the learning of the deep learning model based on the plurality of training signals and on pilot signals corresponding to the plurality of training signals;

detecting an error of the deep learning model via a result of performing of the learning; and updating a weight of the deep learning model for the channel estimation and the channel equalization, based on the error of the deep learning model.

13. The method of claim 12, wherein the performing of learning comprises:

converting the plurality of training signals having different sizes to converted training signals corresponding to a reference size; and performing learning of the deep learning model based on the converted training signals and on the pilot signals.

14. The method of claim 12, wherein the detecting of the error comprises:

detecting the pilot signals corresponding to the plurality of training signals, based on the plurality of training signals, and detecting a noise reduction error based on the result of performing of the learning.

15. The method of claim 14, wherein the updating of the weight of the deep learning model is based on the channel estimation error, the signal restoration error, and the noise reduction error.

16. The method of claim 11, wherein the deep learning model comprises a neural network for the channel estimation and the channel equalization.

17. The method of claim 16, wherein the applying the received signal and the reference signal to the deep-learning model comprises:

obtaining a down-sampled received signal by performing down-sampling of a size of the received signal based on the size of a corresponding pilot signal, combining the down-sampled received signal and the corresponding pilot signal into a combined signal, obtaining an output signal by extracting a feature of the combined signal, and up-sampling the output signal such that the output signal matches the size of the received signal, wherein the performing the channel estimation comprises performing the channel estimation corresponding to the received signal based on a feature of the up-sampled signal, wherein the performing the channel equalization comprises restoring a transmitted signal corresponding to the received signal based on the feature of the up-sampled signal.

18. The method of claim 17, wherein the extracting the features comprises extracting a feature of the combined signal via at least one of a depthwise separable convolution, a residual channel attention block (RCAB), a layer attention block (LAM), or a channel spatial attention block (CSAM).

19. The method of claim 17, wherein the down-sampled received signal is obtained via pixel shuffle based on the size of the corresponding pilot signal.

20. The method of claim 17, wherein the performing up-sampling comprises:

performing up-sampling of the output signal via pixel shuffle.

* * * * *